United States Patent
Weber

(10) Patent No.: US 7,486,681 B2
(45) Date of Patent: Feb. 3, 2009

(54) SCHEDULING OF REALTIME COMMUNICATION IN SWITCHED NETWORKS

(75) Inventor: Karl Weber, Altdorf (DE)

(73) Assignee: Siemens AG, Munich (DE)

( * ) Notice: Subject to any disclaimer, the term of this patent is extended or adjusted under 35 U.S.C. 154(b) by 789 days.

(21) Appl. No.: 10/788,472

(22) Filed: Mar. 1, 2004

(65) Prior Publication Data

US 2004/0233905 A1    Nov. 25, 2004

(30) Foreign Application Priority Data

Feb. 28, 2003    (DE) ................ 103 09 164

(51) Int. Cl.
*H04L 12/28* (2006.01)
(52) U.S. Cl. .................................. 370/395.4
(58) Field of Classification Search ................ 370/394, 370/395.41, 395.42, 486, 493
See application file for complete search history.

(56) References Cited

U.S. PATENT DOCUMENTS 4,819,229 A    4/1989 Pritty et al.

2001/0002195 A1    5/2001 Fellman et al.
2001/0038610 A1*   11/2001 Decker et al. ................ 370/230
2002/0064157 A1*   5/2002 Krause ........................ 370/393
2005/0041690 A1*   2/2005 Arnold et al. ................ 370/493

FOREIGN PATENT DOCUMENTS

WO    WO 98/34415 A2    8/1998

* cited by examiner

*Primary Examiner*—Chirag G Shah
*Assistant Examiner*—Yong Zhou
(74) *Attorney, Agent, or Firm*—Sughrue Mion, PLLC

(57) ABSTRACT

A method and a switching router for simple scheduling of realtime data telegrams with calculable load-insensitive cycle times. A transmission cycle (4) is subdivided into three phases. In a first phase (1), only realtime data telegrams are sent; in a second phase (2), realtime and non-realtime data telegrams are sent; and in a third phase (3), the transmission of long non-realtime data telegrams is suppressed. Short filler telegrams can be sent during the phase (3). This ensures that data transmission of the realtime data telegrams will proceed smoothly. Transmission in certain phases is regulated by the priorities assigned to the data telegrams.

11 Claims, 1 Drawing Sheet

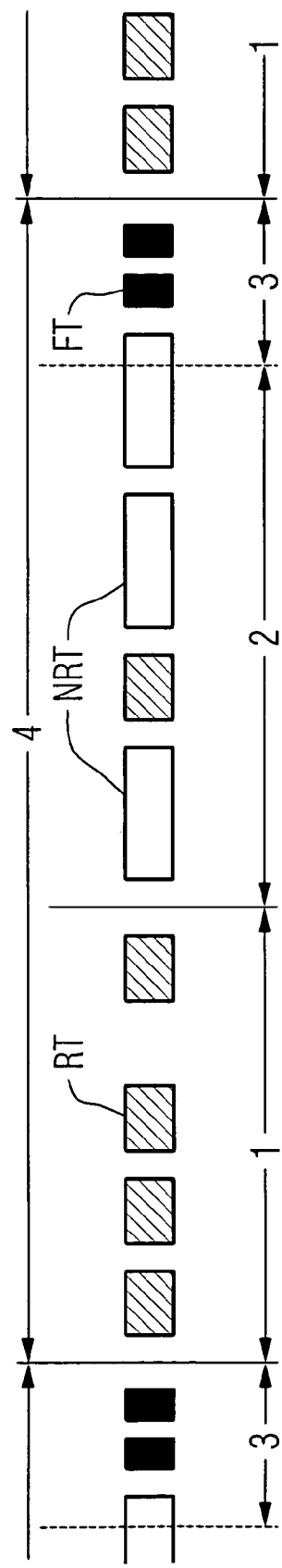

SCHEDULING OF REALTIME COMMUNICATION IN SWITCHED NETWORKS

The following disclosure is based on German Patent Application No. 103 09 164.5, filed on Feb. 28, 2003, which is incorporated into this application by reference.

FIELD OF AND BACKGROUND OF THE INVENTION

This invention relates to a method and a switching router for simple scheduling of realtime data telegrams in calculable, load-insensitive cycle times.

Ethernets are being used increasingly today in the automation environment. An automation system requires a calculable response time. It must be certain that data can be transmitted within a defined period of time. Cycle time is one component of the response time in data transmission. When using an Ethernet, there is no primary calculability of the response time and/or cycle time. This is due to the fact that the basic regulating mechanism thereof functions according to a so-called "best effort" principle, which usually ensures good response times but is load dependent. In other words, at times of high communication traffic and/or when the volume of data to be transmitted is high, the response time can no longer be guaranteed.

There are various methods of bypassing this weakness in principle. As a rule, these methods tend to use special network components or the operation of standard Ethernet nodes is prohibited. However, this significantly limits the applicability and acceptance of this technique.

German patent application 100 58 524.8 discloses a method for transmission of data over switchable data networks, in particular an Ethernet in the field of industrial installations, in which realtime-critical and non-realtime-critical data are transmitted. According to the reference, the data are transmitted in a transmission cycle with an adjustable period, where each transmission cycle is subdivided into a first range for transmission of realtime-critical data for the realtime control and a second range for transmission of non-realtime-critical data. The German application discussed in this paragraph is incorporated into the present application by reference.

OBJECTS OF THE INVENTION

One object of this invention is to provide a method which will improve upon the transmission of realtime-critical data and non-realtime-critical data as part of a network, in particular an Ethernet, for an automation system.

SUMMARY OF THE INVENTION

This and other objects are achieved by a method of data transmission over a network that includes: in a first phase during a transmission cycle, sending solely realtime data telegrams over the network; in a second phase during the transmission cycle, sending realtime data telegrams and/or non-realtime data telegrams over the network; and in a third phase during the transmission cycle, suppressing the transmission of non-realtime data telegrams, wherein the third phase is followed by a new transmission cycle with a new first phase, during which solely further realtime data telegrams are sent.

A primary advantage of the method described here is that realtime data telegrams, so-called realtime data, can be sent with calculable and load-insensitive cycle times. This method allows so-called scheduling in which certain cycle times are reserved exclusively for sending realtime data. During these phases, relatively long non-realtime data telegrams are kept in the system, i.e., they are not forwarded. This method functions to a certain extent like traffic signal control, in which the realtime data traffic is sent through the system with a determinable lag time. However, before the phase for realtime data traffic begins, there is a type of intermediate phase during which relatively short non-realtime data telegrams can still be sent, to utilize the capacity of the data transmission system as efficiently as possible. During this phase, only relatively long realtime data telegrams are not sent further. This phase is advantageous, in order to find, on entrance into the realtime phase, a network that is free of interfering long telegrams. If demands regarding realtime capability are low, this phase could also be omitted. However, this gives rise to jitter in the RT phase, which is thereby disadvantageously prolonged.

One embodiment of this method is implemented on switching routers, i.e., switches, with the help of implemented priorities. Data telegrams are sent as a function of their priority in the different phases of the transmission cycle. For example, at a priority of 'zero' or 'one', any data traffic present at the respective switching router (switch) is forwarded. During this priority, both realtime data telegrams and non-realtime data telegrams can be sent. At a priority of 'two', only short data telegrams which fill up the capacity, so to speak, but which can definitely be concluded during the given phase are sent. In other words, this ensures that there is no data backlog at the beginning of the next phase, which is defined by a priority of 'three'. As such, the communication system, e.g., an Ethernet, is free for the data traffic of the realtime data telegrams. The priorities 'zero' and 'one' are blocked by the short messages of priority 'two', but on the other hand, the priority 'three' is allowed to pass through.

In such a method, it is important for the switching routers, i.e., switches, to operate in synchronization. They must all operate at the same priority at the same time in order for the realtime data telegrams to then also be relayed over the data transmission system with no problem. In other words, the switches must be synchronized with respect to their priorities and phases. This is where the method according to this invention provides a possibility for calculating the time synchronization by calculating the lag time in data transmission between two nodes in the network, i.e., two switches. At the same time, a synchronization signal is used to permit synchronization of the nodes involved in the network, in addition to synchronization of the lag time.

This method is based on a combination which allows a hardware solution, such as that proposed in the International Patent Application PCT/WO 99 150722,as well as the Precision Time Protocol PTP (IEEE 1588), which uses the follow-up principle. By combining the two methods, an optimum time synchronization method can be implemented inexpensively even on standard switches. Both of the references mentioned in this paragraph are incorporated into the present application by reference.

According to a further formulation, the invention is also directed to a switching router for data transmission over a network, having at least four implemented priorities and configured to: send exclusively realtime data telegrams over the network in a first phase of a transmission cycle in accordance with the priorities; send at least one of realtime data telegrams and non-realtime data telegrams over the network in a second phase of the transmission cycle in accordance with the priorities; and suppress the transmission of long non-realtime data telegrams in a third phase of the transmission cycle in accordance with the priorities.

It is advantageous to use a switching router, i.e., switch, as part of this method in which different priorities are implemented which allow sending realtime data telegrams and/or non-realtime data telegrams in different phases. This permits, in particular, an inexpensive implementation in the form of an Ethernet. Standard components can be used as part of the data transmission system, which results in an increased acceptance of the Ethernet technology in the automation field. With the method described here, it is especially advantageous that the different priorities are implemented with a phase reserved for the realtime data communication and a phase during which long non realtime data telegrams are held back, although the capacity of the data transmission system is still efficiently utilized, in that small filler telegrams with a short transmission time are used here. Therefore a data backlog in the data transmission system is prevented, which under some circumstances could lead to a delay in the transmission of realtime data telegrams. On the whole, this ensures a determinable cycle time for the transmission of realtime data telegrams.

BRIEF DESCRIPTION OF THE DRAWINGS

This invention is described and explained in greater detail below on the basis of the exemplary embodiment depicted in the FIGURE.

DETAILED DESCRIPTION OF THE PREFERRED EMBODIMENTS

The FIGURE shows a method implemented for data transmission, in which in a first phase 1, realtime data telegrams RT are sent over a data network designed in particular as an Ethernet; in a second phase 2, non-realtime data telegrams in NRT and realtime data telegrams RT are sent; and in a third phase 3, the transmission of long non-realtime data telegrams NRT is suppressed. These three phases 1, 2, 3 together yield the transmission cycle 4. The sequence of phases is relative here inasmuch as the third phase 3, in which transmission of long non-realtime data telegrams NRT is suppressed, is inserted before the first phase 1, which is provided for sending the realtime data telegrams RT. A transmission cycle 4 always consists of all three phases, but it need not begin with the first phase 1. It is also conceivable for the transmission cycle 4 to begin with the second or third phase 2, 3. However, the length of the transmission cycle 4 does not change with such a shift.

This method functions in principle like a type of traffic light control with the help of which the realtime data traffic RT is sent through the system with a determinable lag time. To ensure a constant cycle time, the non-realtime data traffic NRT is suppressed after a certain point in time within the transmission cycle 4. This ensures predictability of the realtime data traffic RT. Within the first phase 1, exclusively realtime data RT is sent. This phase begins at a certain point in time within the transmission cycle 4. This first phase 1 is restricted to a limited period of time (the duration of the phase is approximately 100 to 200 μsec). There follows a subsequent second phase 2, during which non-realtime data NRT is sent together with realtime data RT. The change to phase 1, during which exclusively realtime data RT is sent again, is implemented in such a way that long non-realtime data NRT is held up in a third phase 3. As a result, a data backlog is suppressed and, at the beginning of the next phase 1$i$ in the subsequent transmission 4$i$,the data transmission system is free for the transmission of the realtime data telegrams RT. In the third phase, however, small filler telegrams FT can be sent if it is certain that their transmission will be concluded within the third phase 3.

The method described here is based on a time synchronization between the nodes, i.e., switches, involved in the data communication. For the time synchronization here, a combination method is used in which there is a given delay in the data transmission between two nodes, and a signal is sent for time synchronization between the nodes. The calculation of the delay at a certain node, i.e., between certain connections, can be performed on the basis of an estimate (a line 100 meters long has a delay of approximately 500 ns). In a simple design, the average time by which reception of a message between two nodes would be delayed could be given as 300 ns.

In forwarding a time synchronization signal, automatic calculation of the delay can also be performed with the help of a time message based on a so-called follow-up principle. According to this principle, a first data time telegram with a specific numerical sequence is sent. This first data telegram is followed by a second with the same numerical sequence which additionally contains the time at which the first data telegram was sent. The lag time between the transmitter and the receiver can be calculated on the basis of these data telegrams. The two data telegrams are sent with certain reserved transmission addresses, so that they can be recognized as belonging to the time synchronization and can be filtered out of the system accordingly. It is thus impossible to confuse them with normal data telegrams. The synchronization signal should include the time when it was sent plus additionally all the local time lags.

A procedure that can be used for sending the synchronization signal is given below:

| Originator | | Switch | Next Node |
|---|---|---|---|
| TE( SEQ=x, FU=False, TS=11:55 Delay=5) | | | |
| | (with direct delay) | TE( SEQ=x, FU=False, TS=11:55 Delay=5+ delay_switch+ line_delay_to_next) | |
| | | | Set Time to TS + Delay (regulated) |
| TE( SEQ=x, FU=False, TS=11:55 Delay=5) | | | |
| | | >store receive time (Trcv) | |

-continued

| Originator | Switch | Next Node |
|---|---|---|
| (with follow up)<br>store end time(T snd)< | TE(<br>SEQ=x,<br>FU=True,<br>TS=11:55<br>Delay=5)<br>FU(<br>SEQ=x,<br>TS=11:55<br>Delay=5+ Trcv-Tsnd<br>+ line_delay_to_next) | Set Time to TS +<br>Delay (regulated) |

In summary, this invention relates to a method and a switching router for simple scheduling of realtime data telegrams with calculable load-insensitive cycle times. In accordance with the invention, a transmission cycle 4 is divided into three phases. In a first phase (1), only realtime data telegrams are sent; in a second phase (2), realtime and non-realtime data telegrams are sent; and in a third phase (3), transmission of long non-realtime data telegrams is suppressed. Short filler telegrams can be sent during phase 3. This ensures that the data transmission of realtime data telegrams will proceed without friction. Transmission in certain phases is regulated by priorities assigned to the data telegrams.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method of data transmission over a network, comprising:
   in a first phase during a transmission cycle, sending solely realtime data telegrams over the network;
   in a second phase during the transmission cycle, sending at least one of realtime data telegrams and non-realtime data telegrams over the network; and
   in a third phase during the transmission cycle, sending at least one of short filler telegrams and non-realtime data telegrams while suppressing the transmission of those of the non-realtime data telegrams for which the transmission cannot be concluded during the third phase,
   wherein the third phase is followed by a new transmission cycle with a new first phase, during which solely further realtime data telegrams are sent, and
   wherein the non-realtime data telegrams contain user application data.

2. The method as claimed in claim 1, wherein the network comprises an Ethernet.

3. The method as claimed in claim 1, wherein said sending comprises forwarding the data telegrams.

4. The method as claimed in claim 1, implemented on a switching router, whereby the switching router has at least four transmission priorities.

5. The method as claimed in claim 1, wherein transmission of the short filler telegrams is concluded before the new first phase is started.

6. The method as claimed in claim 1, further comprising performing a time synchronization of the switching routers.

7. The method as claimed in claim 6, wherein the time synchronization is performed with a calculation of a delay between two nodes of the network in combination with a synchronization signal.

8. The method as claimed in claim 1, wherein the network is designed as a line.

9. A switching router for data transmission over a network, having at least four implemented priorities and configured to:
   send exclusively realtime data telegrams over the network in a first phase of a transmission cycle in accordance with the priorities;
   send at least one of realtime data telegrams and non-realtime data telegrams over the network in a second phase of the transmission cycle in accordance with the priorities; and
   send at least one of short filler telegrams and non-realtime data telegrams but suppress, in accordance with the priorities, the transmission of those of the non-realtime data telegrams in a third phase of the transmission cycle for which the transmission cannot be concluded during the third phase,
   wherein the non-realtime data telegrams contain user application data.

10. The method as claimed in claim 9, wherein the network comprises an Ethernet.

11. The method as claimed in claim 9, wherein the sending comprises forwarding the data telegrams.

* * * * *